Sept. 30, 1969           G. GRUN           3,469,562

APPARATUS FOR TREATING POWDERED OR GRANULATED SUBSTANCES

Filed July 22, 1965           2 Sheets-Sheet 1

Sept. 30, 1969          G. GRUN          3,469,562

APPARATUS FOR TREATING POWDERED OR GRANULATED SUBSTANCES

Filed July 22, 1965          2 Sheets-Sheet 2

3,469,562
APPARATUS FOR TREATING POWDERED OR GRANULATED SUBSTANCES

Gustav Grun, Lissberg, Upper Hesse, Germany
Continuation-in-part of application Ser. No. 93,011, Mar. 1, 1961. This application July 22, 1965, Ser. No. 474,134
Claims priority, application Germany, Mar. 2, 1960, G 29,141; July 23, 1964, G 41,164
Int. Cl. B05c 5/02; B05b 17/04
U.S. Cl. 118—24                                    9 Claims

ABSTRACT OF THE DISCLOSURE

Apparatus for treating substances in powder or granulate form with substances in gaseous, liquid or solid form includes an upwardly extending treatment chamber having an outlet at its lower end and a separator extending downwardly from the upper end to below the midpoint. The first substances, suspended in a moving air current, are injected into the upper end of the separator. The chamber has peripherally spaced apertures in its side wall above its outlet and below the lower end of the separator, and spray nozzles are each associated with a respective aperture to spray the gaseous, liquid or solid form substances toward the axis of the chamber. A common annular conduit is connected to the spray nozzles to supply substances thereto. A flow of air is directed into the chamber through the outlet and upwardly through the chamber, and is so proportioned that only the treated particles of the powder or granulate substances flow to the outlet.

---

Figure 1:
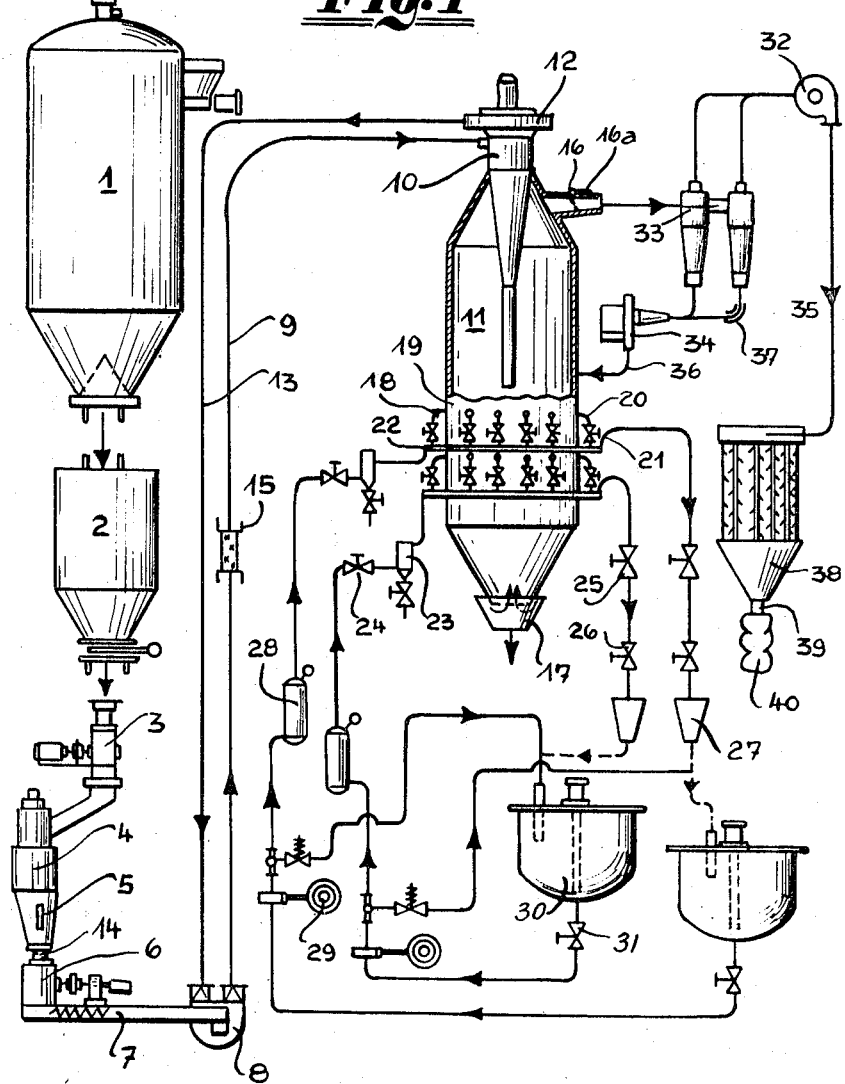
Figure 5:
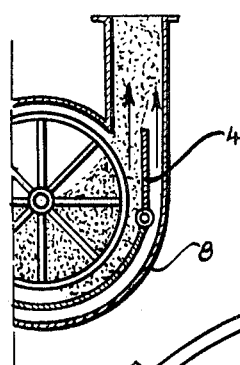
Figure 3:
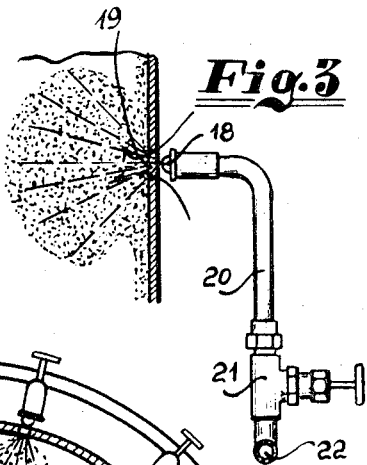
Figure 2:
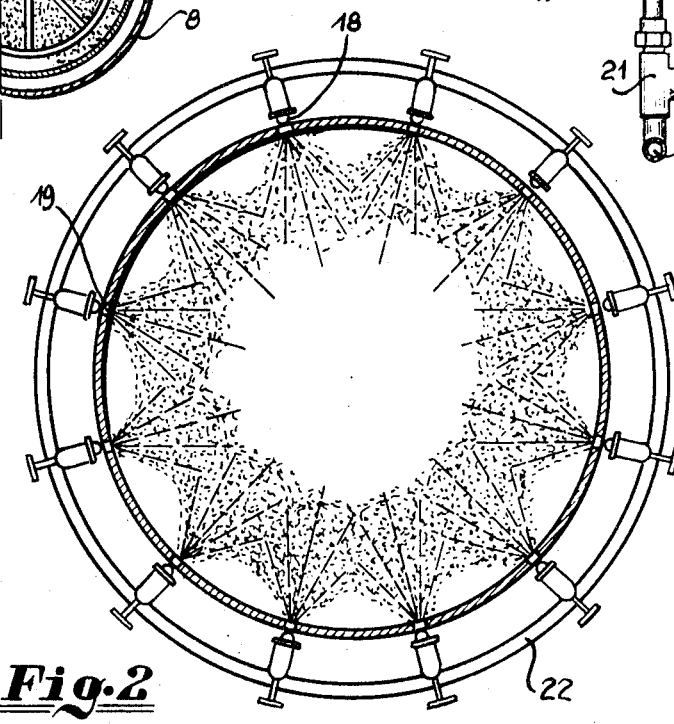
Figure 4:
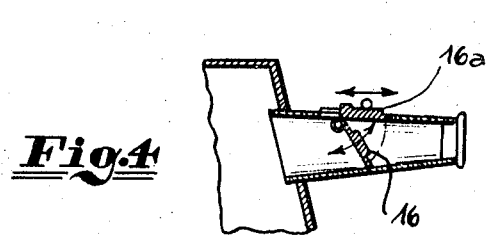

This application is a continuation-in-part of my copending application Ser. No. 93,011, filed Mar. 1, 1961, for "Process for Treating Powdered or Granulated Substances" and now abandoned.

This invention relates to apparatus for treating substances in powder or granulated form and, more particularly, to apparatus of this type in which first substances, in powder or granulated form, are treated with second active or stabilizing substances, in gaseous, liquid or solid form, by injecting the first substances, suspended in a moving air current, through the upper end of a treatment chamber to spiral downwardly through the lower portion of the latter and to be admixed with an upwardly flowing airstream to form a turbulent material-air mixture cloud at a spray region at which second substances are sprayed into the treatment chamber through a plurality of peripherally spaced openings in the side wall of the latter with air being aspirated into the chamber through these openings by the injection action due to such spraying.

The objectives to be obtained by a treatment of powder or granulated substances with active or stabilizing substances, in gaseous, liquid, or solid form, may differ. Thus, in producing one product, a requisite is the complete absence of dust. In another product, it is a requisite that the product be soluble in water or other liquid, while in still a third product, a requisite is that it be miscible with another substance, such as an odorous substance. Furthermore, still another product may have the requisite that it have grains of a particular size.

Frequently, two or even all of these requirements must be met simultaneously. It has been found, by tests, that a substantial improvement of the treated products with respect to meeting the above-mentioned requirements, a better control of the process, and greater safety can be achieved by various modifications of the process and of the apparatus for carrying out the process.

In accordance with one feature of the invention, the treatment chamber is subdivided into a turbulence zone and a steadying zone by extending the material separating inlet well into the treatment chamber.

In accordance with another feature of the invention, the spray nozzle means is subdivided into a plurality of spray nozzles located outside of the treatment chamber. These nozzles are arranged annularly around the outside of the treatment chamber each adjacent an aperture in the side wall thereof, these apertures being spaced peripherally around the side wall of the treatment chamber. The spray nozzles are directed coaxially through the respective apertures and toward the axis of the treatment chamber.

In accordance with another feature of the invention, two or more annular spray rings are arranged in spaced relation one above the other, and provided with monitoring and switching means to disconnect all of the supplies simultaneously in the absence of any one of the supplies, so that there is no after-dripping of liquid from the spray nozzles.

In accordance with still a further feature of the invention, the apparatus is arranged above a drying tower in such a way that the material to be treated drops from the treatment chamber directly into the drying tower. Thus, there is no mechanical stress exerted on the granular treated material even during the drying process. The treated particles always leave the treatment chamber, and pass through the drying tower, in a suspended, slowly sinking state, and are dried gently and then either filled into bags or packed directly beneath the drying tower.

A further feature of the invention is to improve the dust return and increase the degree of dust removal, and particularly to provide uniform dust return in the case of sprayed dust. This is effected by exhausting the dusts into dual separator means by means of a medium pressure blower, and injecting the dusts tangentially into the treatment chamber. Adjustment and regulation of a separation eddy at the separator outlets is effected by apertures or bores formed in bends of a suction line, these apertures or bores influencing the separation eddies at the outlets of the separators. The apertures or bores may be completely or partly closed by means of a displaceable sleeve of rubber or the like.

In accordance with a further feature of the invention, conveying, weighing, and control devices are arranged in such a way that the powder or granulate substance is emptied into a hopper by means of a remote controlled charging balance. This charging balance delivers the dry substance to the hopper in small quantities or metered amounts, such as 5 kg. or less, and these metered amounts or batches are released during predetermined time intervals under control of timing relays. Each metered amount is supplied to the hopper during a predetermined time interval continuing until the next metered amount is ready to be discharged. This is effected by means of an infinitely variable bucket wheel lock discharging into a distribution worm and through a circulating air-fly wheel with a built-in injector. Thereby the material is delivered uniformly to a pneumatic conveyor for discharge into the treatment chamber.

Another object of the invention is to provide an improved apparatus for treating powdered or granular first substances with gaseous, liquid, or solid second substances.

A further object of the invention is to provide such an improved apparatus including a treatment chamber which is subdivided into a turbulence zone and a steadying zone by a material separating inlet element extending downwardly into the treatment chamber.

Yet another object of the invention is to provide such an improved apparatus in which a plurality of spray nozzles, positioned exteriorly of the treatment chamber in an annular ring, discharge the second substances into to treatment chamber through peripherally spaced apertures at a spray region within the treatment chamber, these spray nozzles spraying the second substances coaxially of the apertures and toward the vertical axis of the treatment chamber.

Still another object of the invention is to provide an improved apparatus of the type just mentioned in which the second substance or substances are sprayed into the treatment chamber by means of plural vertically spaced spray rings.

A still further object of the invention is to provide an improved apparatus of the type mentioned in which monitoring and switching devices are provided to disconnect all the supplies of the second substances simultaneously in the absence of one of the second substances or of the first subtance.

Yet another object of the invention is to provide an improved apparatus of the type mentioned in which a treatment chamber is positioned above a drying tower in such a manner that the material to be treated drops from the treatment chamber directly into the drying tower.

Still a further object of the invention is to provide an improved apparatus of the type just-mentioned in which the treated particles leaving the treatment chamber pass through the drying tower in a suspended slowly sinking state whereby they are dried gently.

Another object of the invention is to provide an improved apparatus of the type mentioned in which dust return is improved and an increase of the degree of dust removal is attained, and in which a uniform dust return is supplied with sprayed dusts.

A further object of the invention is to provide an improved apparatus of the type mentioned in which the sprayed dusts are exhausted by dual separator means through the medium of a medium pressure blower, and are injected tangentially into the treatment chamber.

Still another object of the invention is to provide an improved apparatus of the type mentioned in which separation eddies at the outlets of the separators are influenced by apertures formed in bends of the suction line and controlled by displaceable sleeves of rubber or the like.

Yet a further object of the invention is to provide an improved apparatus of the type mentioned including conveying, weighing, and control devices arranged to deliver the substances to be treated as metered charges each delivered through a predetermind time interval.

Still a further object of the invention is to provide an improved apparatus of the type mentioned in the preceding paragraph in which the metered charges are fed to an infinitely variable bucket wheel lock and thence into a distribution worm and through a circulating air flywheel, having a built-in injector, which delivers the first substances uniformly to a pneumatic conveyor for discharge into the treatment chamber.

In accordance with the mentioned tests, it has further been found that similarity and uniformity of the granular structure depends on how the original product was mixed. These tests have shown that a material mixed in an air mixer, such as shown in German Patent No. 1,152,877, yields better results with respect to the uniformity of the granular materials.

For an understanding of the principles of the invention, reference is made to the following description of typical embodiments thereof as illustrated in the accompanying drawings.

In the drawings:

FIG. 1 is a somewhat schematic flow diagram illustrating the invention;

FIG. 2 is a transverse sectional view through a treatment chamber, illustrating the annular arrangement of the spray nozzles about the exterior of the treatment chamber;

FIG. 3 is a partial vertical sectional view through an injection aperture and illustrating a nozzle, the supply means therefor, the hand control valve and the annular conduit;

FIG. 4 illustrates a detail of a flap valve and a slide valve controlling flow of material to the dust separators; and FIG. 5 is a partial diametrical sectional view through the air fly wheel and illustrating the injector flap.

In the process diagram shown in FIG. 1, an air mixer is arranged ahead of the spraying operation proper. In the air mixer 1, the individual components are mixed gently by means of air. The mixing time is 10–20 seconds, so that a uniform flow is attained without formation of bridges, particularly in fine powdered substances. The mixing is effected in batches, which are then fed to the secondary tank 2. From secondary tank 2, the mixed first substances, of a powdered or granular nature, flow through a coarse dosing lock or sluice 3 into a balance 4. Balance 4 delivers relatively small batches or metered quantities of the mixed powdered or granular material into a hopper 5.

Balance 4 is operatively associated with a timing relay which, at the expiration of a predetermined time interval, initiates tipping of the balance to deliver a charge into the hopper 5. During the same time interval, the material contained in hopper 5 has been fed through an infinitely variable bucket wheel lock or sluice 6, a worm conveyor 7, and an air flywheel 8 to a pneumatic conveyor or lift 9. Conveyor 9 delivers the material into the treatment chamber 11 through a separator 10 which discharges the material in the lower portion of the treatment chamber 11.

The interior of treatment chamber 11 is at a negative pressure of 50–80 mm. water column. The conveying air for pneumatic conveyor 9 flows through blower 12, return line 13 and flywheel 8 in a continuous cycle. By observation of a cylinder glass 14, it is possible to regulate the dosing effected by bucket wheel lock 6, having an infinite variable drive, in such a manner that the material is removed from hopper 5 right up to the beginning of the next charge from balance 4. Thus, a very accurate dosing of the granular or powdered substance is possible, because the weight accuracy from one batch to the next, for example, at 5 kg., is determined by the balance. These 5 kg. batches, for example, are distributed throughout a 14 second charging period to the bucket wheel lock 6. A further check is possible by observation of the glass cylinder or inspection glass 15. Any interruptions or gaps in the flow of the powdered or granular material can be equalized by adjustment of the infinitely variable drive of the bucket wheel lock 6.

Flywheel 8 has the function of accelerating the material to the conveying speed to avoid a pulsating conveying movement, and also the function of reducing the pressure downstream of bucket wheel lock 6, by means of the injector 41 illustrated in FIG. 5. These measures are necessary to insure a trouble-free flow of powdered substances or different quality through bucket wheel lock 6.

The negative pressure produced in treatment chamber 11 by low pressure blower 12, and which can be varied by the regulating flap 16 and the slide valve **16*a* shown in FIG. 4, causes air to be drawn into treatment chamber 11 through the outlet 17, this air flowing upwardly through the descending dry or granular material. By virtue of this, the dry or granular material is flung upwardly in a sort of central fountain, and forms a cloud into which the spray nozzles 18, arranged as an annular set around the exterior of treatment chamber 11, spray the second substance or liquid in finely dispersed form through peripherally spaced apertures 19 in the side wall of treatment chamber 11**, as best illustrated in FIG. 2. By virtue of this type of spraying, the deposit of spray material on the jacket of the treatment chamber is prevented, and a maximum surface contact and uniform distribution of the liquid in the dry material is obtained. The spray nozzles 18 direct the liquid spray coaxially of the apertures 19 and toward the vertical axis of treatment chamber 11.

In the usual manner, the liquid second substance is fed by means of charging or dosing piston pumps 29, including the necessary safety fittings, and is delivered through pressure equalizing tanks 28 to the main access diaphragm valves 24. Downstream of each diaphragm valve 24 there is arranged a pressure filter 23 which is directly in front of the associated annular supply conduit for nozzles 18. The liquid from pressure filter 23 flows, through the annular distribution conduits 22, to the individual nozzle connections 20 which, as best seen in FIG. 3, are each controlled by a hand valve 21. Opposite each inlet duct leading from a pressure filter 23 to a conduit 22, a discharge conduit is connected to each conduit 22. As best seen in FIG. 1, this discharge conduit is arched upwardly through 180° of arc and to a height which is lower than the height of the individual nozzle connections between the associated ring conduit 22 and the spray nozzles 18.

Each conduit 22 can be discharged through a diaphragm valve 25 and through a lateral offtake provided with a hand valve 26. Diaphragm valves 24 and 25 are remote controlled by a suitable control valve associated with each one thereof. The hand valve 26 serves to regulate the amount of liquid injected under the required nozzle pressure. In effect, the arrangement comprises a return flow arrangement with a specific inlet pressure and a specific outlet pressure, so that the liquid is sprayed into the treatment chamber 11 under the differential between the inlet pressure and the outlet pressure in the associated annular supply conduit 22. Preferably, hand valve 26 is designed as a needle valve, and is arranged to be throttled until the desired differential or working pressure has been attained.

The return liquid flows into hoppers 27 from which it may be discharged into a suitable tank or returned to the fat tank 30 which is normally charged from a liquid preparation plant which has not been shown. The fat tanks 30 are equipped with level indicators, thermostats and automatic controls. Discharge from the fat tanks 30 is effected by a conduit extending to the suction sides of the charging pumps 29, each conduit having a hand valve 31 therein.

The air flowing upwardly through treatment chamber 11 from the outlet 17 thereof is drawn through separators 33 by a blower 34 which delivers the dust, separated from the air, back to the treatment tank 11. In order to maintain and adjust the separation to an optimum degree, and to effect efficient return of the dust through blower 34, a regulating flap is arranged in the suction line. As best illustrtaed in FIG. 4, this regulating means comprises a pivotal flap valve 16 and a slide valve **16*a*. When flap valve 16 is closed, the air current through treatment chamber 11 is throttled. The cross sectional area above flap valve 16*a* increases, and can be regulated by slide valve 16*a* so that the separators 33** perform an optimum degree of separation.

The harmful effects of pulsation currents, occurring in the treatment chamber, on the separation eddies at the outlets of separators 33 are avoided by exhausting, from both separators, some air along with the dust and injecting it by means of the separate high pressure blower 34 and the connecting line 36 tangentially into treatment chamber 11 in the same direction as the dust conveying current. Each separator has a separate exhaust line, and these two lines are united immediately ahead of blower 34, the lines having bends therein. These bends are provided with several apertures or openings 35 which are normally covered by sleeves 37 of rubber or the like and which are opened only in case of clogging. Exhaust of air from separators 33 is effected by a suction blower 32, and the exhaust air is delivered to a pressure filter 38 having a collecting hopper and an outlet duct 39 which may receive a collecting bag 40.

The following examples will illustrate the operation of the invention. Of these examples, the first two relate to the production of a milk substitute feed which has 17% fat, and of a skim milk feed with up to 55% fat.

Example 1

The starting components comprise 30% sprayed skim milk, 30% rolled skim milk, 10% sugar or swelling starch, 10–15% whey powder and 1% vitamins, and these components are thoroughly mixed in air mixer 1 and discharged, after mixing, into tank 2. The remainder of the starting mixture is fat.

While the mixing of the components is effected in batches, the fat is sprayed continuously into the treatment. From tank 1, mixed milk powder flows through bucket wheel lock 3 into balance 4 and is fed through glass cylinder 14, bucket wheel lock 6, worm conveyor 7, air fly wheel 8 and pneumatic conveyor 9 into spreader 10 and thus delivered to the lower part of treatment chamber 11. This is effected continuously and with a uniform flow delivering a predetermined output to the treatment chamber 11. After a predetermined time interval of from 10 to 40 seconds, the fat is automatically introduced by operating the corresponding diaphragm valves 24. The end product is discharged from the outlet of hopper 17 and filled into bags.

Example 2

In this example, instead of the previously mentioned components, only sprayed skim milk or roller skim milk is used and these are fed to tank 2 without mixing. The procedure is the same as in Example 1, with the difference that the air entering through outlet 17 from the exterior is cooled to +5° C. by means of a cooling unit. The amount of heat which must be eliminated by cooling corresponds approximately to the heat evalved by solidification of the fat. The extent of cooling influences the fineness of the end product.

Example 3

In this example, powdered substances are treated to increase their solubility in the same manner as the powdered skim milk concentrate is treated in the previous two examples. For example, this example may relate to the productions of a mixture for cocoa drinks, such as that known as "Kakaotrunk." The components consist of 73.5% powdered sugar, 25% starch, and 1.5% flavor substance. These components are homogenously mixed in air mixer 1 and subsequently sprayed with 10% water, which is effected by the spray treatment in treatment chamber 11 in the same manner as described in Example 2. The product is then dried down to 5% by means of a cooling-drying tower arranged beneath the spray tank. The product thus obtained shows a uniform granular structure, has a loose or porous composition, is highly hygroscopic, and dissolves rapidly in either water or milk.

Example 4

In this example, easily soluble grain flours are produced using the same procedure as in Example 3. The difference is that the flour is first reduced to a fineness of 50$\mu$ and is subsequently subjected to the spray process by adding about 10% water in chamber 11. The product is finally dried down to a normal moisture of 14% while passing through the suspension drier.

What is claimed is:

1. Apparatus for treating first substances, in powder or granulate form, with second active or stabilizing substances, in gaseous, liquid, or solid form, said apparatus comprising, in combination, an upwardly extending treatment chamber having an outlet at its lower end; a separator extending downwardly from the upper end of said chamber to below the midpoint thereof; means for injecting the first substances, suspended in a moving air current, into the upper end of said separator to spiral downwardly from the lower end of said separator through the lower portion of said treatment chamber; a plurality of peripherally spaced apertures formed in the side wall of said treatment chamber above said outlet and below the lower end of said separator, at a spray region within said chamber; a plurality of spray nozzles positioned exteriorly of said chamber and each associated with a respective aperture to spray second substances coaxially of the associated aperture toward the vertical axis of said chamber; a common annular conduit exteriorly embracing said chamber and connected to said spray nozzles to supply second substances to the latter; and means for effecting a flow of air into said treatment chamber through said outlet and upwardly through said chamber to form a turbulent material-air mixture cloud at such spray region, the air flow being so proportioned that only the treated particles of the first substance flow to said outlet, with the untreated particles being returned to such spray region.

2. Apparatus for treating first substances, in powder or granulate form, with second active or stabilizing substances, in gaseous, liquid, or solid form, said apparatus comprising, in combination, an upwardly extending treatment chamber having a conical hopper at its lower end forming an outlet therefor; a separator extending downwardly from the upper end of said chamber to below the midpoint thereof; means for injecting the first substances, suspended in a moving air current, into the upper end of said separator to spiral downwardly from the lower end of said separator through the lower portion of said treatment chamber; a plurality of peripherally spaced apertures formed in the side wall of said treatment chamber above said outlet and below the lower end of said separator, at a spray region within said chamber; a plurality of spray nozzles positioned exteriorly of said chamber and each associated with a respective aperture to spray second substances coaxially of the associated aperture toward the vertical axis of said chamber; a common annular conduit exteriorly embracing said chamber and connected to said spray nozzles to supply second substances to the latter; and means for effecting a flow of air into said treatment chamber through said outlet and upwardly through said chamber to form a turbulent material-air mixture cloud at such spray region, the air flow being so proportioned that only the treated particles of the first substance flow to said outlet, with the untreated particles being returned to such spray region, said apertures being formed above the upper end of said conical hopper outlet in the lower third of said treatment chamber.

3. Apparatus for treating first substances, in powder or granulate form, with second active or stabilizing substances, in gaseous, liquid, or solid form, said apparatus comprising, in combination, an upwardly extending treatment chamber having an outlet at its lower end; a separator extending downwardly from the upper end of said chamber to below the midpoint thereof; means for injecting the first substances, suspended in a moving air current, into the upper end of said separator to spiral downwardly from the lower end of said separator through the lower portion of said treatment chamber; a plurality of peripherally spaced apertures formed in the side wall of said treatment chamber above said outlet and below the lower end of said separator, at a spray region within said chamber; a plurality of spray nozzles positioned exteriorly of said chamber and each associated with a respective aperture to spray second substances coaxially of the associated aperture toward the vertical axis of said chamber; a common annular conduit exteriorly embracing said chamber and connected to said spray nozzles to supply second substances to the latter; means for effecting a flow of air into said treatment chamber through said outlet and upwardly through said chamber to form a turbulent material-air mixture cloud at such spray region, the air flow being so proportioned that only the treated particles of the first substance flow to said outlet, with the untreated particles being returned to such spray region; a manually operated valve interposed between each spray nozzle and said annular conduit; and remote controlled valve means controlling the supply of second substances to said annular conduit.

4. Apparatus for treating first substances, in powder or granulate form, with second active or stabilizing substances, in gaseous, liquid, or solid form, said apparatus comprising, in combination, an upwardly extending treatment chamber having an outlet at its lower end; a separator extending downwardly from the upper end of said chamber to below the midpoint thereof; means for injecting the first substances, suspended in a moving air current, into the upper end of said separator to spiral downwardly from the lower end of said separator through the lower portion of said treatment chamber; a plurality of peripherally spaced apertures formed in the side wall of said treatment chamber above said outlet and below the lower end of said separator, at a spray region within said chamber; a plurality of spray nozzles positioned exteriorly of said chamber and each associated with a respective aperture to spray second substances coaxially of the associated aperture toward the vertical axis of said chamber; a common annular conduit exteriorly embracing said chamber and connected to said spray nozzles to supply second substances to the latter; means for effecting a flow of air into said treatment chamber through said outlet and upwardly through said chamber to form a turbulent material-air mixture cloud at such spray region, the air flow being so proportioned that only the treated particles of the first substance flow to said outlet, with the untreated particles being returned to such spray region; a supply line connected to said annular conduit to deliver second substances thereto; manually operable valves, each interposed between said annular conduit and a respective spray nozzle; a remote controlled valve interposed in said supply line; a discharge line connected to said annular conduit and extending upwardly and then downwardly through an arc of 180°; and a remote controlled valve in said discharge line.

5. Apparatus for treating first substances, in powder or granulate form, with second active or stabilizing substances, in gaseous, liquid, or solid form, said apparatus comprising, in combination, an upwardly extending treatment chamber having an outlet at its lower end; a separator extending downwardly from the upper end of said chamber to below the midpoint thereof; means for injecting the first substances, suspended in a moving air current, into the upper end of said separator to spiral downwardly from the lower end of said separator through the lower portion of said treatment chamber; a plurality of peripherally spaced apertures formed in the side wall of said treatment chamber above said outlet and below the lower end of said separator, at a spray region within said chamber; a plurality of spray nozzles positioned exteriorly of said chamber and each associated with a respective aperture to spray second substances coaxially of the associated aperture toward the vertical axis of said chamber; a common annular conduit exteriorly embracing said chamber and connected to said spray nozzles to supply second substances to the latter; means for effecting a flow of air into said treatment chamber through said outlet and upwardly through said chamber to form a turbulent material-air mixture cloud at such spray region, the air flow being so proportioned that only the treated particles of the first substance flow to said outlet, with the untreated particles being returned to such spray region; a supply line connected to said annular conduit to deliver second substances thereto; manually operable valves, each interposed between said annular conduit and a respective spray nozzle; a remote controlled valve interposed in said supply line; a discharge line connected to said annular conduit and extending upwardly and then downwardly through an arc of 180°;

a remote controlled valve in said discharge line; and a manual valve in said discharge line adjustable to set the effective pressure of the spray from said spray nozzles.

6. Apparatus for treating first substances, in powder or granulate form, with second active or stabilizing substances, in gaseous, liquid, or solid form, said apparatus comprising, in combination, an upwardly extending treatment chamber having an outlet at its lower end; a separator extending downwardly from the upper end of said chamber to below the midpoint thereof; means for injecting the first substances, suspended in a moving air current, into the upper end of said separator to spiral downwardly from the lower end of said separator through the lower portion of said treatment chamber; a plurality of peripherally spaced apertures formed in the side wall of said treatment chamber above said outlet and below the lower end of said separator, at a spray region within said chamber; a plurality of spray nozzles positioned exteriorly of said chamber and each associated with a respective aperture to spray second substances coaxially of the associated aperture toward the vertical axis of said chamber; a common annular conduit exteriorly embracing said chamber and connected to said spray nozzles to supply second substances to the latter; means for effecting a flow of air into said treatment chamber through said outlet and upwardly through said chamber to form a turbulent material-air mixture cloud at such spray region, the air flow being so proportioned that only the treated particles of the first substance flow to said outlet, with the untreated particles being returned to such spray region; an exhaust line extending from the upper end of said chamber exteriorly of said separator; a blower connected to said exhaust line and discharging into said chamber at a point intermediate the upper and lower ends thereof; and a regulating device in said discharge line in advance of said blower, said regulating device comprising a flap valve in said discharge line and a slide valve closing an aperture in said discharge line downstream of said flap valve and in advance of said blower.

7. Apparatus for treating first substances, in powder or granulate form, with second active or stabilizing substances, in gaseous, liquid, or solid form, said apparatus comprising, in combination, an upwardly extending treatment chamber having an outlet at its lower end; a separator extending downwardly from the upper end of said chamber to below the midpoint thereof; means for injecting the first substances, suspended in a moving air current, into the upper end of said separator to spiral downwardly from the lower end of said separator through the lower portion of said treatment chamber; a plurality of peripherally spaced apertures formed in the side wall of said treatment chamber above said outlet and below the lower end of said separator, at a spray region within said chamber; a plurality of spray nozzles positioned exteriorly of said chamber and each associated with a respective aperture to spray second substances coaxially of the associated aperture toward the vertical axis of said chamber; a common annular conduit exteriorly embracing said chamber and connected to said spray nozzles to supply second substances to the latter; means for effecting a flow of air into said treatment chamber through said outlet and upwardly through said chamber to form a turbulent material-air mixture cloud at such spray region, the air flow being so proportioned that only the treated particles of the first substance flow to said outlet, with the untreated particles being returned to such spray region, a pair of dust separators; a dust discharge line connecting the upper end of said chamber, exteriorly of said first mentioned separator, to each of said second mentioned separators; a blower; means separately connecting the outlets of each of said dust separators to the inlet of said blower; and means connecting the outlet of said blower to the interior of said treatment chamber intermediate the upper and lower ends thereof to discharge dust and air from said dust separators tangentially into said treatment chamber.

8. Apparatus for treating first substances, in powder or granulate form, with second active or stabilizing substances, in gaseous, liquid, or solid form, said apparatus comprising, in combination, an upwardly extending treatment chamber having an outlet at its lower end; a separator extending downwardly from the upper end of said chamber to below the midpoint thereof; means for injecting the first substances, suspended in a moving air current, into the upper end of said separator to spiral downwardly from the lower end of said separator through the lower portion of said treatment chamber; a plurality of peripherally spaced apertures formed in the side wall of said treatment chamber above said outlet and below the lower end of said separator, at a spray region within said chamber; a plurality of spray nozzles positioned exteriorly of said chamber and each associated with a respective aperture to spray second substances coaxially of the associated aperture toward the vertical axis of said chamber; a common annular conduit exteriorly embracing said chamber and connected to said spray nozzles to supply second substances to the latter; means for effecting a flow of air into said treatment chamber through said outlet and upwardly through said chamber to form a turbulent material-air mixture cloud at such spray region, the air flow being so proportioned that only the treated particles of the first substance flow to said outlet, with the untreated particles being returned to such spray region; said injecting means including a pneumatic conveyor communicating at one end with the upper end of said separator; balance means effective to deliver measured batches of said first substance; and an air fly wheel connected to receive the batches from said balance means and to deliver a continuous flow of said first substances to the other end of said pneumatic conveyor.

9. Apparatus for treating first substances, in powder or granulate form, with second active or stabilizing substances, in gaseous, liquid, or solid form, said apparatus comprising, in combination, an upwardly extending treatment chamber having an outlet at its lower end; a separator extending downwardly from the upper end of said chamber to below the midpoint thereof; means for injecting the first substances, suspended in a moving air current, into the upper end of said separator to spiral downwardly from the lower end of said separator through the lower portion of said treatment chamber; a plurality of peripherally spaced apertures formed in the side wall of said treatment chamber above said outlet and below the lower end of said separator, at a spray region within said chamber; a plurality of spray nozzles positioned exteriorly of said chamber and each associated with a respective aperture to spray second substances coaxially of the associated aperture toward the vertical axis of said chamber; a common annular conduit exteriorly embracing said chamber and connected to said spray nozzles to supply second substances to the latter; means for effecting a flow of air into said treatment chamber through said outlet and upwardly through said chamber to form a turbulent material-air mixture cloud at such spray region, the air flow being so proportioned that only the treated particles of the first substance flow to said outlet, with the untreated particles being returned to such spray region; said injecting means including a pneumatic conveyor communicating at one end with the upper end of said separator; balance means effective to deliver measured batches of said first substance; an air fly wheel connected to receive the batches from said balance means and to deliver a continuous flow of said first substance to the other end of said pneumatic conveyor; said injection means further including a hopper for supplying material to said balance means; a worm conveyor extending between said balance means and said air fly wheel; and an injector at the outlet of said air fly wheel in communication with said pneumatic conveyor.

References Cited
UNITED STATES PATENTS

| | | | |
|---|---|---|---|
| 1,854,100 | 4/1932 | Brito | 118—303 X |
| 2,071,846 | 2/1937 | Lamb et al. | 118—303 |
| 2,594,469 | 4/1952 | Mahoney | 117—100 |

WALTER A. SCHEEL, Primary Examiner

JOHN P. McINTOSH, Assistant Examiner

U.S. Cl. X.R.

118—303